Figure 1B:
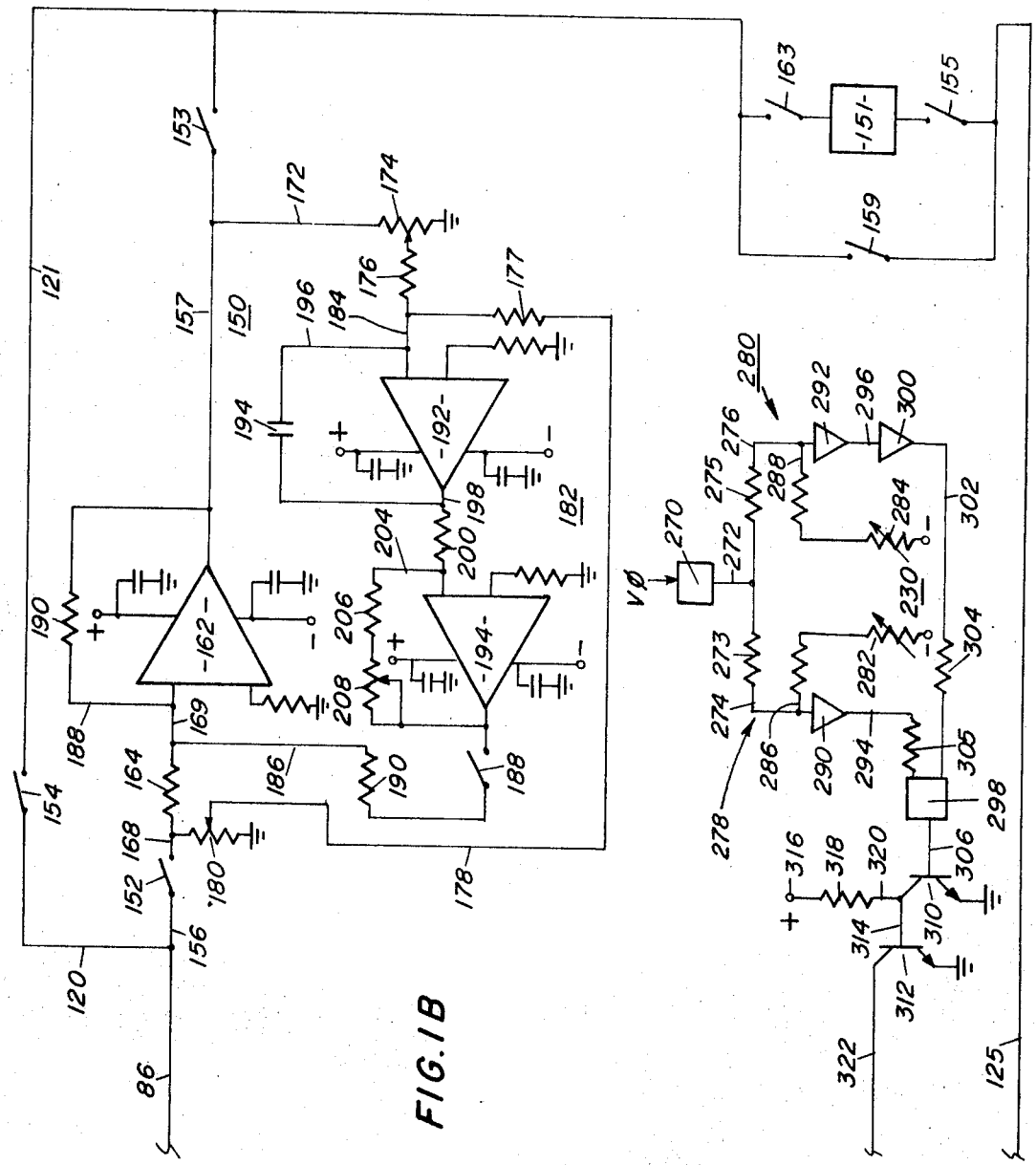

United States Patent
Hauf

[15] 3,656,048
[45] Apr. 11, 1972

[54] NON-LINEAR EXCITER CONTROLLER FOR POWER SYSTEM DAMPING

[72] Inventor: Adolf W. Hauf, Bonneville Power Administration, Lewiston, Idaho 83501

[73] Assignee: The United States of America as represented by the Secretary of the Interior

[22] Filed: July 16, 1970

[21] Appl. No.: 55,541

[52] U.S. Cl. .................................. 322/19, 307/84, 322/20, 322/24, 322/25
[51] Int. Cl. ............................................ H02p 9/32
[58] Field of Search .................. 322/19, 20, 24, 25; 307/84

[56] References Cited

UNITED STATES PATENTS

| | | |
|---|---|---|
| 2,981,882 | 4/1961 | Rosenblatt..........................322/24 |
| 3,474,323 | 10/1969 | Kilgore et al.........................322/28 X |
| 2,478,623 | 8/1949 | Crary et al............................322/20 |
| 2,872,591 | 2/1959 | Stineman...........................322/20 X |

Primary Examiner—Lewis H. Myers
Assistant Examiner—H. Huberfeld
Attorney—Ernest S. Cohen and Gersten Sadowsky

[57] ABSTRACT

Damping of power system oscillations is accomplished by additionally directing exciter-voltage regulation for individual system generators in accordance with variations in the derivative of reactive power generated by a generator. Signal voltage proportional to reactive power in generator output is differentiated to develop a signal voltage representing rate of change of reactive power variations which is applicable as an auxiliary input for determining operational control of exciter-voltage regulation of the generator. Control for suppressing system oscillations is continuous as long as generator bus voltage does not exceed pre-set upper and lower voltage limits.

4 Claims, 2 Drawing Figures

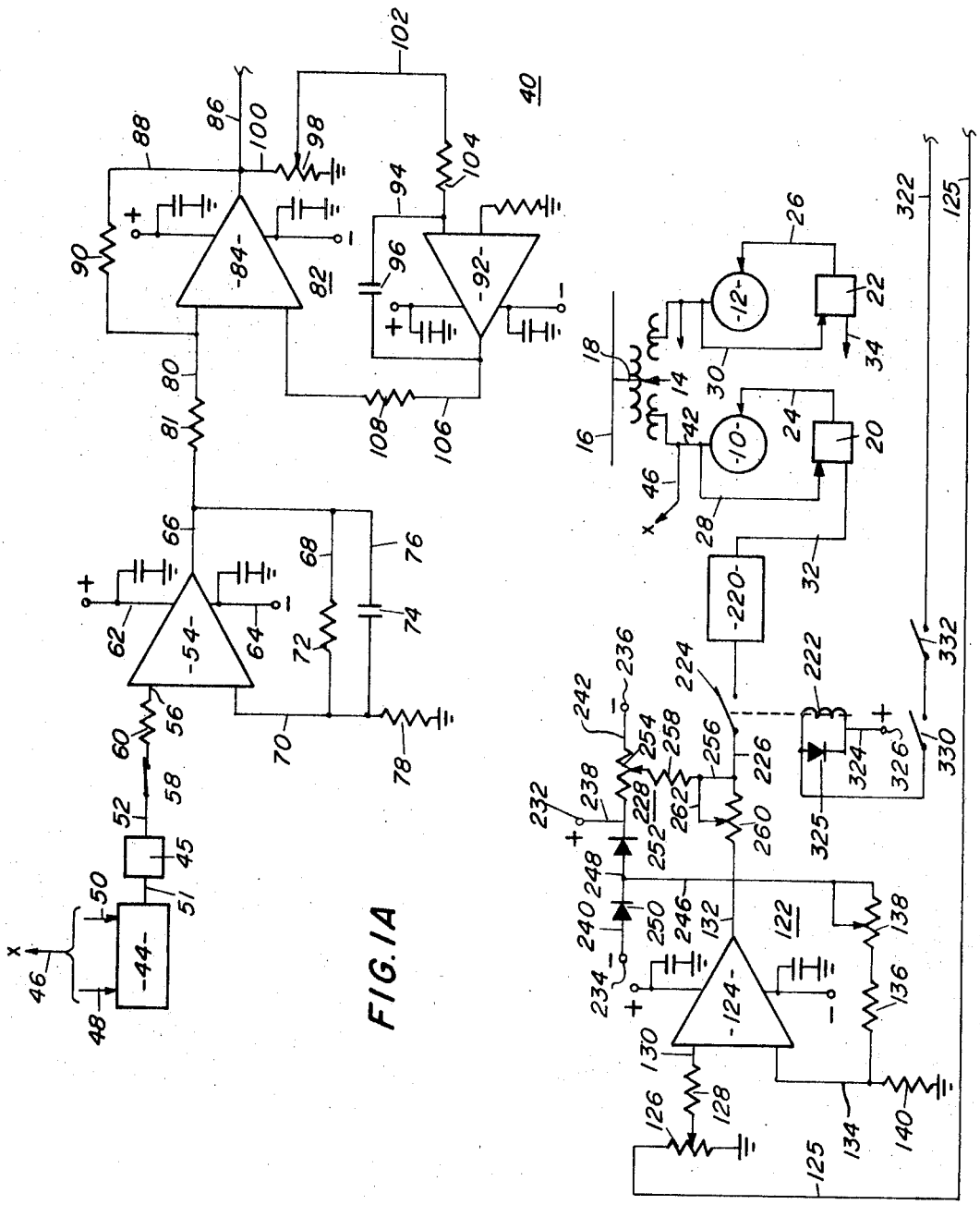
FIG. IA
INVENTOR
ADOLF W. HAUF
Ernest S. Cohen
BY Gersten Sadowsky
ATTORNEYS

NON-LINEAR EXCITER CONTROLLER FOR POWER SYSTEM DAMPING

BACKGROUND OF THE INVENTION

The invention relates to advancements in operational procedures and equipment for power generating stations which improve the performance of power transmission and distribution systems. Performance quality is largely dependent on system stability, or ability to regain equilibrium following periodic system disturbances such as caused by line faults which trip out transmission lines causing load losses and otherwise critically change the power flow paths of transmission networks and therewith the power factor and other characteristics of the generator loads. Voltage control by voltage regulators at the generator stations is routinely employed to rapidly arrive at a requisite equilibrium. Advances flowing from the invention maintain an improved regulation at the generating stations which dampens system oscillations and secures overall systems operating stability. Importantly involved is the application of a non-linear control which is responsive to reactive power at generator output terminals and thus a function of the manner in which the generator is excited, the length and type of transmission line used to connect the generator to the load or system, the type of disturbance that occurs in a power system and its location relative to each generator. More specifically, the control is a function of the derivative of the reactive power demanded at a particular power plant such that plants in an area of a severe system disturbance have a large control signal applied to their exciter-voltage regulators whereas plants remotely located from the disturbance have a small, if any, control signal applied to their exciter-voltage regulators. Consequently, the total integrated power system complete with its behavior determines the control signal at each plant relative to the contribution by the plant to the system with the result that the plant most likely to be lost from the power system due to a system disturbance automatically receives the largest control signal so as to damp the disturbance in an optimal manner.

PRIOR ART

Reactive power sensed at generator terminals has been used previously to establish controls, through voltage regulation, for maintaining the synchronism of individual generators and accomplishing power equalization among multiple generators of a system. In a U.S. Pat. No. 2,478,623, granted Aug. 9, 1949 to S. B. Crary et al., is described a voltage regulator control which in response to a measurement of reactive power provides an adjustable lower limit on alternator field excitation for protecting the alternator against asynchronism. The control prevents the field voltage on the alternator from being reduced to a point where due to under-excitation synchronizating torque between the rotor and the stator is such that the alternator will pull out of synchronism with the rest of a power system. The apparatus disclosed by Crary et al. is therefore a protective device for a single alternator becoming operatively effective only when voltage regulation action critically decreases field excitation. Power equalization apparatus disclosed in a U.S. Pat. No. 2,872,591, granted Feb. 3, 1959, to R. W. Stineman provides reactive power sensors and responding control for individual alternators of a paralleled alternator system wherein each reactive power sensor is connected to receive input signals from more than one alternator. As a result, the corrective signal generated for impression on the exciter field winding of the individual alternators maintains the reactive power equally divided among the alternators while maintaining system voltage at a predetermined regulated value.

It is evident that in the utilization of reactive power as a controlling factor in directing alternator operation, as exemplified by the patented arrangements previously considered, there has not been recognized that the derivative of reactive power can be effectively applied to determine system stabilization control. Heretofore, power system frequency was generally used to determine a control variable for system stabilization. The invention of U.S. Pat. No. 3,465,235, granted Sept. 2, 1969, to F. R. Schleif et al. is representative of an advanced form of this type of system stabilization control. However, effective system stabilization control based on power system frequency cannot be maximized since the amplitude or rate of change of frequency is relatively the same at each plant. Thus, in applying corrective control quantities to power plants of a system such stabilization control fails to assign the control quantities among the power plants in accordance with the magnitude or scope of the disturbance affecting the individual plants. On the other hand, the present invention provides for the production at each power plant of a corrective control quantity which is proportional to the derivative of the reactive power signal amplitude at the plant and thus corresponding to operational conditions at the plant as well as the relative stability conditions in the overall systems.

SUMMARY OF THE INVENTION

Optimum power system stability is achieved through damping swing oscillations in system power flow by a unique auxiliary exciter control on the system generators. In a three phase power system the output terminals of each generator have connections thereto, made by way of three phase potential and current transformers, from a transducer which is adapted to produce a voltage proportional to the reactive power (VAR) generated by the generator. Following filtering and amplification of the VAR signal, in a conventional manner, the signal is processed through further amplification in a differentiator plus a wash-out response which determines an amplified signal representative of the VAR rate of change which decays exponentially with a time constant equal to the amplifier combination time constant. An exciter control quantity thus produced is fed to a driver whose output is controlled by a logic controlled limiter which is designed to protect the alternator terminal voltage from becoming too high or too low. The driver output is fed to the input of the exciter-voltage regulator, usually a magnetic amplifier, for the generator which in a conventional manner establishes the generator output as a function of the regulation. Since the reactive power measured by the VAR transducer is a function of the terminal voltage a closed control loop is formed which enables a continuing stabilizing action to become part of the regular voltage regulation control on the generator. An adjustable exciter compensation facility is additionally provided in the auxiliary exciter control to boost feedback gain where exciter response drops off too rapidly.

It is therefore a primary object of the present invention to provide an improved stability control procedure for the operation of electrical power generator systems which is based on a function of reactive power in the generator output.

This and other objects and advantages of the invention will become more fully apparent from the following description of a preferred embodiment of the invention when considered together with the accompanying drawing in which FIGS. 1A and 1B taken together constitute a schematic representation of electrical connections and components interrelated thereby constituting the embodiment of the invention as adapted for cooperation with a power system generator.

Reference is made to the schematic showing of the drawing where representations of two AC generators 10 and 12, and transformer connections 14 coupling the generators to a system network 16 by way of a branch line 18, are intended to indicate a power system in which the present invention is operable to effect stabilization. Generators 10 and 12 have operatively associated therewith voltage regulating equipment 20 and 22, respectively, each comprising an exciter (not shown) which supplies load compensating control voltage to the field windings of the generators by way of connections represented by leads 24 and 26, respectively. Voltage regulators of the type indicated are conventional in the art, and for a more detailed disclosure thereof reference may be made to the previously identified patent to Schleif et al. Regulators 20 and 22 are supplied on leads 28 and 30, respectively, with generator terminal voltages, in the usual manner, and additionally on lines 32 and 34, respectively, with auxiliary control voltages which are derived for each generator in the controller associated therewith in accordance with the present invention. Since a controller according to the invention is cooperatively related with each generator of the system in the same way, an exemplary disclosure herein is limited to the controller 40 of generator 10.

A measurement of reactive power in the three phase, four wire distribution line 42 from the output terminals of generator 10, is taken by a VAR transducer 44 coupled a line 42 by a wire bundle of 10 leads represented by the X extension of line 46. Lines 48 and 50 appear in the drawing to indicate that bundle 46 comprises connections to three current transformers, and a three phase, four wire potential transformer in line 42 which connects the transducer to generator 10. Transducer 44 produces as an output signal on a lead 51, to a conventional twin T notch filter 45 tuned to the transducer ripple frequency, the output of the filter on a lead 52 being a DC voltage which is proportional to the three phase reactive power of the generator. The type of VAR transducer employed must be compatible with the type of power system involved. A one element device such as disclosed by U.S. Pat. No. 3,218,554, granted Nov. 16, 1965, to A. J. Corson, in its FIG. 5, is applicable to a single phase power system, and a two element device such as disclosed in FIG. 6 of the Corson patent would have utility in a three phase, three wire power system. The three phase, four wire power system of the present disclosure requires a three element transducer in the nature of that manufactured by Scientific Columbus, Inc., of Columbus, Ohio, as its model VT34-2K5. Also having utility in connection with the present invention, where unbalance in one of the phases to neutral is not a problem, is the transducer disclosed by U.S. Pat. No. 3,286,178, granted J. P. Ultcht, in its FIG. 1.

The reactive power signal is preamplified in a DC operational amplifier 54 which receives this signal at a non-inverting input terminal thereof by way of a circuit path including filter lead 52 and a lead 56. A normally closed service switch 58, and an input resistor 60 for the preamplifier complete the circuit path. An energizing circuit for amplifier 54 includes leads 62 and 64, respectively, connected to the positive and negative of a DC source, and having further of to by-pass circuits equipped with capacitors which return to a general ground in a conventional manner and operate to smooth variations in the supply input. When amplifier 54 is operational, at a typical gain of 100, feedback supplied to its inverting terminal is derived from amplifier output on a lead 66, and applied by way of leads 68 and 70 having connected therein a feedback resistor 72. Overall gain for the amplifier is chosen, by changing resistance 60 or resistance 72, as a function of the generator being controlled, and the amount of control action that is desired. Reduction of high frequency noise is achieved in a conventional manner with a filter capacitor 74 in a parallel feedback connection on a lead 76. Since the response of the exciter-voltage regulator, and the region of frequencies of interest in the control loop associated therewith, is below 1 Hz. this filter circuit is tuned above the 1Hz. level to remove noise from the operational amplifier which would only saturate the amplifier. The inverting terminal of amplifier 54 is returned to ground by way of the feedback connections thereto including an extension of lead 70 having a resistor 78 connected therein which minimizes amplifier voltage offset.

The preamplifier signal on lead 66 is also received on a connecting lead 80, and through a resistor 81 is introduced to a differentiating arrangement 82. A summer operational amplifier 84 of the arrangement is supplied at an inverting input terminal thereof with the signal on lead 80, and the signal at its output terminal which is carried by way of a feedback circuit through a lead 88 having a resistor 90 connected therein. The non-inverting input terminal of amplifier 84 receives feedback input by way of integrator circuitry of arrangement 82 wherein an amplifier 92 is operational with a feedback therefor on a lead 94 having an integrator capacitor 96 connected therein. Input to an inverting terminal of amplifier 92 includes the output of amplifier 84 which is supplied thereto through a potentiometer 98 connected in a lead 100 extended from lead 86, and further connections from the contact arm of the potentiometer on a lead 102 having an input resistor 104 connected therein. A non-inverting input terminal of amplifier 84 is supplied with the integrator output by way of a lead 106 having an input resistor 108 connected therein. Amplifiers 84 and 92 have conventional energizing inputs having leads to which by-pass capacitors are connected in circuits to ground. To amplifier 92, at a non-inverting terminal thereof, is further connected a circuit to ground in which a resistor is connected to minimize voltage offset. Thus amplifiers 84 and 92 are arranged to produce a voltage representing a differential quantity corresponding to the rate of change of the reactive power in generator 10. However, the derivative is relatively pure only up to a predetermined point in frequency whereupon it is no longer the derivative of the input and degrades in a wash-out effect.

Potentiometer 98 is settable to determine a time constant, tau, for the aforesaid wash-out effect which is appropriate of the operating characteristics of generator 10. As indicated, the combined effect of amplifiers 84 and 92 produces as output on lead 86 the true derivative of the input on lead 66 when the frequency of this input is approximately less than $1/2\pi$ tau Hz. When this frequency is exceeded the derivative action is slowly lost or "washed-out" with increasing frequency and the output is representative of a derivative plus a lag function. Such operational behavior is desired and necessary so that the VAR feedback loop around the voltage-regulator excitor does not make the regulator action unstable at high frequencies. Potentiometer 98 is proportional to 1/tau, and adjustable to set the point in frequency where the control function washes out from correspondence to a pure derivative to a derivative plus a lag function. The amplifier gain of this operation is set to 1.0 so that the high frequency noise generated in the circuit would not be amplified and then differentiated to produce an even larger amplitude of noise.

The reactive power response signal available on lead 86 is transmitted by way of a connecting lead 120 to a switch 154 and by way of a connecting lead 121 to a switch 159 from where a connecting lead 125 extends to gain control circuit 122 comprising a variable gain amplifier 124. A signal received at a non-inverting terminal of amplifier 124 is determined by a potentiometer 126 connected in lead 125 and equipped with a settable contact in a circuit to the amplifier terminal comprising an input resistor 128 in a lead 130. Feedback from an output lead 132 of the amplifier to an inverting terminal thereof is provided by way of circuit comprising a lead 134 in which are connected fixed and adjustable resistors 136 and 138, respectively. A further connection to the inverting terminal is grounded through a resistor 140 adapted to minimize voltage offset. Thus an amplifier voltage output on lead 132 is predetermined to have a gain in a range from 0 to 50 by setting attenuator gain at potentiometer 126, and adjusting feedback variable gain at resistor 138.

Provisions made to boost the gain characterizing input to amplifier 124 in the event the frequency response of the exciter-voltage regulator and the alternator tied thereto decreases at frequencies where control is still desirable and there are sufficient gain and phase margins remaining, include exciter response compensator arrangements 150 and 151. These arrangements being identical, a detailed description thereof is given by way of reference to only arrangement 150. The reactive power response signal on lead 86 also appears as input to the inverting terminal of a summer amplifier 162 in an input circuit comprising a resistor 164 between leads 168 and 169. Compensator control is enabled by presettable feedback circuitry which extends between lead 168 at the amplifier 162 input and lead 157 at the amplifier output, and includes lead 172, a gain control potentiometer 174, input resistances 176 and 177, and lead 178 to a further gain control potentiometer 180. A feedback network 182 arranged in circuitry extending between connections to amplifier input lead 169 and a lead 184 from a junction of resistors 176 and 177, is also adapted to determine the operation of amplifier 162 in compensator 150. Thus, the aforesaid circuitry includes a lead 186 interrupted at a by-pass switch 188, which upon closure establishes the effectiveness of network 182 through a circuit path containing a resistor 190 for installation test purposes. Network 182 is essentially a combination of an integrator-amplifier 192 and a variable gain, inverting summer amplifier 194. The signal effective at the input terminal of amplifier 192 is a summation of the voltages sensed at control potentiometers 174 and 180, and discharge from a feedback capacitor 194 in a lead 196 of the integrator circuit. Output of the integrator on a lead 198 is received, by way of an input resistance 200, at the inverting input terminal of amplifier 194. A feedback circuit for amplifier 194 includes in a lead 204, a feedback resistor 206, and an adjustable feedback resistor 208. Each of the network amplifiers is further equipped at a non-inverting terminal thereof with a voltage offset circuit, of the type previously described. Operational power is supplied to the amplifier from positive and negative terminals related to ground by way of capacitors in circuits of the type also previously described.

Amplifiers 162, 192, and 194 cooperate in the combination of circuitry constituting arrangement 150 to generate a lead-lag function which is applicable to compensate the frequency response of the exciter-voltage regulator and the generator field winding at high frequencies above the roll off point frequency $\omega_r$. Compensation is thus provided since gain of the feedback loop, comprising the instant VAR controller, increases as frequencies rise from frequency $\omega_r$ to a higher frequency $\omega_s$, whereas the gain of the exciter-voltage regulator and the AC machine, constituting the forward loop, drops as the frequency rises toward frequency $\omega_s$. A corresponding relationship is reflected in phase shift which in the feedback loop is supported by the lead-lag compensation to compensate for the phase shift in the forward loop. More-particularly proper adjustment of the lead-lag compensation requires the product of the gain in the forward path and the feedback path to be less than 1.0 when the phase of the VAR approaches −180° from normal so as to insure that the control loop is stable. Potentiometer 174 is used to adjust compensation arrangement 150 for a frequency $\omega_2$ rising above frequency $\omega_s$ to the point in frequency where the lead-lag function starts to behave as a lag function. Potentiometer 180 is used to adjust arrangement 150 for a frequency $\omega_1$ dropping below frequency $\omega_s$ and toward frequency $\omega_r$ to the point in frequency where the lead-leg function starts to behave as a lead function only. Potentiometer 208, which controls the gain of amplifier 194, in effect shifts both frequency points $\omega_1$ and $\omega_2$ together in the frequency spectrum. Usually frequency point $\omega_2$ is set equal to 10 $\omega_1$. Once potentiometers 174 and 180 are adjusted as indicated potentiometer 208 is operable to allow both $\omega_1$ and $\omega_2$ to be shifted in frequency together and yet maintain the relative decade spacing of these frequencies. Compensation is thus easily adjusted and tuning the control loop for stable operation is facilitated.

Gain control circuit 122 generates a signal for regulating the operation of a magnetic amplifier 220. However, this signal is effective only as long as a limiter control relay 222 is energized to maintain its contact 224 closed in a circuit comprising a lead 226 which connects magnetic amplifier 220 to a biasing network 228 therefor. Relay 222 remains energized during a predetermined range of conditions as interpreted by a logic circuit 230, to be hereinafter more fully explained. The control exercised by biasing network 228 over magnetic amplifier 220 is in turn determined by the output of amplifier 224 on lead 132. Positive voltage at terminal 232, and negative voltage at terminals 234 and 236, energize network 228 by way of leads 238, 240, and 242. Further leads 246 and 248 extend a circuit from amplifier output lead 132 to between the cathode and anode of a pair of diodes 250 and 252, respectively, which act to protect the amplifier from surges in the magnetic amplifier 220 voltage. Network 228 additionally includes voltage presetting circuitry in which a potentiometer 254 connected between power terminal leads 238 and 242, comprises a contact arm in a lead 256, containing a resistor 258, extending from magnetic amplifier input lead 226. Also included is a potentiometer 260, in amplifier output lead 132, which comprises a contact arm in a lead 262 connected to magnetic amplifier input lead 226 by way of lead 256. Whereas a basic control potential for magnetic amplifier 220 is presettable by adjustment of potentiometer 254, adjustment of potentiometer 260 presets the range of current values deliverable to the magnetic amplifier from the control output produced by amplifier 124.

Amplifier 124 is responsive to compensator voltage when connector switches 154 and 159 are open, and connector switches 152 and 153, together with connector switches 163 and 155 are closed. The polarity connection on lead 226 to magnetic amplifier 220 is dependent upon whether compensator arrangement 150 is used along or along with arrangement 151. On the other hand the frequency and phase response of the exciter-voltage regulator and the alternator, or forward loop, may indicate that no compensation is necessary. In that case connector switches 152, 153, 163 and 155 are opened, and connected switches 154 and 159 are closed, such that the compensator arrangements are removed from the controller. If it is found from the aforesaid response that one compensator arrangement is desirable, then connector switch 154 is opened, and connector switches 152 and 153 are closed together with switch 159. Since connector switches 163 and 155 are left open, compensator arrangement 151 remains removed from the controller. As was previously indicated, connection of lead 226 to magnetic amplifier 220 must be made with a polarity which is compatible with the extent of compensator connections made in each instance.

The overall adjustable gain of the complete loop is essentially controlled by circuitry of driver-limiter amplifier 124. This control is accomplished by adjusting potentiometer 126 and potentiometer 138 individually or together. In the disclosed structural embodiment these adjustments allow for a variation of a factor of 50.0. Since the previously described preamplifier has a fixed gain of 100 the total loop gain may be varied from 0 to 5,000 by the aforesaid adjustments. Gain is chosen to complement a particular generator and exciter-voltage regulator, and can be increased or decreased by selecting suitable resistors for the amplifiers, as for example resistor 60 or 72 in amplifier 54, resistor 128 or 138 in amplifier 124, and resistor 81 or 90 in amplifier 84. An additional non-inverting amplifier is connectable to the control loop in an obvious manner if the aforesaid component changes are not sufficient to yield the desired gain. When the controller disclosed herein is to be installed on a particular AC machine, a magnitude and a phase plot is made of the exciter-voltage regulator and the AC machine to its terminals. This magnitude and phase plot dictates the maximum control loop gain and phase shift in order to insure that the combined system remains stable with the control loop in service.

Logic circuit 230 is essentially a comparator arrangement wherein one phase voltage at the output from generator 10 is compared to voltages corresponding to preset upper and lower limits for generator regulation. Accordingly, a voltage sensed across a generator phase output is initially processed in conventional rectifier and filter circuitry 270. The rectified and filtered output supplied on output lead 272 is applied across separate input resistors 273 and 275 respectively connected in leads 274 and 276, which constitute input connections to conventional comparator circuits 278 and 280, respectively. Predetermined lower and upper voltage limits are set by adjustments of negatively energized potentiometers 282 and 284, respectively, so as to determine corresponding currents on leads 286 and 288, respectively, having connections to leads 274 and 276 whereas such currents are compared with currents representing generator output as determined by resistors 273 and 275. Comparator output components 290 and 292 function in accordance with the resultant bias current to produce logic output voltages on leads 294 and 296. An OR-circuit 298 is provided to receive the logic voltage from comparator 278 directly by way of lead 294, and resistor 305, and from comparator 280 by way of lead 296 and a logical inverter circuit 300 therein, having an output on a lead 302 containing a resistor 304. Any operation wherein the generator voltage is less than the lower limit, and therefore also less than the upper limit, positive voltages appear on leads 294 and 296, whereas lead 302 is at zero voltage, and an output lead 306 of OR-circuit 298 is at a positive voltage. On the other hand, when the generator voltage is greater than the upper limit, and therefore also greater than the lower limit, leads 294 and 296 are at zero voltage, and a positive voltage appears on lead 302, as well as an OR-circuit output lead 306. However, when the generator voltage is between the voltage limits, that is less than the upper limit setting, and greater than the lower limit setting, lead 294 is a zero voltage, a positive voltage appears on lead 296, and since lead 302 is then at a zero voltage, the resulting voltage on OR-output lead 306 is also at zero. Logic circuit control over relay 222 is effectuated by way of a switching circuit comprising a first NPN-transistor 310 which controls the conductivity of a second NPN-transistor 312 through a collector to base connection 314 between the respective transistors. Collector voltage for transistor 310 is taken at a positive supply terminal 316 and applied across a resistance 318 connected in a lead 320 reaching the collector of transistor 310. The emitters of both transistor are grounded.

During the time generator voltage remains within the preset predetermined limits, a connection from the OR-circuit output lead 306 to the base of transistor 310, applies zero voltage at the base so as to effectively inhibit conduction through the transistor. Consequently, the positive potential on lead 320 is applicable to lead 314, and thus seen at the base of transistor 312. The resultant conduction through the collector-emitter of transistor 312 establishes a current path to ground for a circuit comprising leads 322 and 324, in which limiter relay 222 is energizable from a positive power source terminal 326. In the event generator voltage is beyond either limit, the positive voltage on lead 306 at the base of transistor 310 establishes conduction through resistor 318 by way of the collector-emitter of the transistor. The voltage drop across resistor 318 negatively biases transistor 312 so as to prevent conduction therethrough. As a result energization of relay 222 is interrupted, and the relay de-activates. Lead 322 in the relay control circuit is equipped with first and second switches 330 and 332, respectively, to permit on and off control of the present invention from remote locations such as central control units in a power house or a control room. In the normal course of operation a continuing energization of relay 222 maintains its contact 224 closed so as to facilitate a constant control input from the system of the invention to magnetic amplifier 220. Variable output from magnetic amplifier 220 reaches the exciter controller 20 of generator 10, by way of lead 32, and the stabilizing influence of the exciter control is additionally established in accordance with the auxiliary control of the non-linear variation of the derivative of the reactive power sensed at the generator output terminals. Moreover, as is well understood in the art relating to the present invention, cut-off of the aforesaid auxiliary control in accordance with the operation of the previously disclosed logic circuit, is desirable at the upper limit to prevent arcing in the generator, and at the lower limit to avoid a critical loss of generator field current.

While preferred forms of the method and physical embodiment of the invention have been illustrated and described herein, it is understood that the invention is not limited thereby, but is susceptible to change in form and detail.

What is claimed is:

1. Phased power system damping apparatus, providing an auxiliary exciter control for at least one AC generator of said power system wherein an exciter-voltage regulator operatively associated with said generator comprises a magnetic amplifier, said apparatus comprising a reactive power transducer operable to sense the reactive power generated by every phase of said generator and produce a voltage output corresponding to variations in said reactive power, a differentiating circuit arrangement operable in response to input thereto of said reactive power variation voltage output to produce a differentiator voltage output representative of the rate of change of said reactive power variations voltage input thereto, further amplifier means comprising an operational amplifier having adjustable overall gain control means including an adjustable feedback resistor providing a relatively wide range of gain control, and voltage and current presettable means including a biasing network control, said adjustable operational amplifier being responsive to input of said reactive power variations rate of change voltage output for producing a voltage applied to said presettable biasing network which in turn determines voltage output applicable as a controlling voltage input to said magnetic amplifier whereby said magnetic amplifier is effective accordingly to produce a control voltage in said exciter-voltage regulator.

2. The apparatus of claim 1, further comprising a circuit connection through which said controlling voltage output of said biasing network is applied to said magnetic amplifier, a relay having normally open contacts in said circuit connections, a presettable logic network adapted to control the operation of said relay, said logic network including means sensing the output voltage of said generator and producing a representative voltage therefor, separate adjustable voltage driving means settable to represent a lower limit and a higher limit of said generator output voltage, respectively, between which limits said auxiliary exciter control is adapted to be effective, means separately comparing said generator output representative voltage with said respective limit representing voltages, and means including switching means responsive to the outputs of said comparing means to produce an output voltage only when said generator output representative voltage is between said limit representing voltages, whereby said logic network input voltage is applicable to energize said relay and close the contact thereof in said circuit connections.

3. The apparatus of claim 1 further comprising adjustable phase lead-lag compensating networks whereto said reactive power variations rate of change voltage is initially supplied and the gain thereof modified therein in response to frequency increases beyond a basic operational frequency therefor, and wherefrom said modified reactive power variations rate of change voltage is supplied as said input to said operational amplifier of said further amplifier means.

4. The apparatus of claim 3 wherein said lead-lag compensating networks include a phase lag function gain adjustment means settable to compensate for the effect of frequencies rising above a predetermined frequency increase beyond said basic operational frequency, and a phase lead function gain adjustment means settable to compensate for the effect of frequencies dropping below a predetermined frequency increase beyond said basic operational frequency.

* * * * *